(12) United States Patent
Park et al.

(10) Patent No.: US 9,904,077 B2
(45) Date of Patent: Feb. 27, 2018

(54) TUNABLE NANO-ANTENNA AND METHODS OF MANUFACTURING AND OPERATING THE SAME

(71) Applicant: SAMSUNG ELECTRONICS CO., LTD., Suwon-si (KR)

(72) Inventors: Yeonsang Park, Seoul (KR); Jineun Kim, Suwon-si (KR); Younggeun Roh, Seoul (KR); Changwon Lee, Hwaseong-si (KR); Sangmo Cheon, Bucheon-si (KR); Unjeong Kim, Osan-si (KR); Chanwook Baik, Yongin-si (KR); Youngzoon Yoon, Hwaseong-si (KR); Jaesoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/916,052

(22) PCT Filed: Aug. 29, 2014

(86) PCT No.: PCT/KR2014/008062
§ 371 (c)(1),
(2) Date: Mar. 2, 2016

(87) PCT Pub. No.: WO2015/030518
PCT Pub. Date: Mar. 5, 2015

(65) Prior Publication Data
US 2016/0223843 A1 Aug. 4, 2016

(30) Foreign Application Priority Data
Sep. 2, 2013 (KR) .................. 10-2013-0105100

(51) Int. Cl.
*B82Y 20/00* (2011.01)
*G02F 1/01* (2006.01)
(Continued)

(52) U.S. Cl.
CPC ............ *G02F 1/0102* (2013.01); *B82Y 20/00* (2013.01); *B82Y 40/00* (2013.01);
(Continued)

(58) Field of Classification Search
CPC .... G02F 1/0018; G02F 1/0045; G02F 1/0081; G02F 1/009; G02F 1/01; G02F 1/0102;
(Continued)

(56) References Cited

U.S. PATENT DOCUMENTS 7,348,928 B2 * 3/2008 Ma ....................... H01Q 13/103
343/767
8,474,726 B2 * 7/2013 Finn .................. G06K 19/07794
235/492

(Continued)

FOREIGN PATENT DOCUMENTS

JP 2012-522235 A 9/2012
KR 10-2012-0077417 A 7/2012
(Continued)

OTHER PUBLICATIONS

Saumyakanti Khatua et al.; "Active Modulation of Nanorod Plasmons"; NANO Letters; ACS Publications; American Chemical Society; vol. 11; 2011; 6 pages total.
(Continued)

*Primary Examiner* — Loha Ben
(74) *Attorney, Agent, or Firm* — Sughrue Mion, PLLC

(57) ABSTRACT

Provided are an optical nano-antenna including a tunable material layer and methods of manufacturing and operating the optical nano-antenna. The optical nano-antenna includes a substrate; and a plurality of material layers sequentially
(Continued)

laminated on the substrate. The plurality of material layers include at least one tunable material layer and at least one slot. A first tunable material layer and a metal layer are sequentially laminated on the substrate, and a first slot is formed in the metal layer. A metal layer and a first tunable material layer are sequentially laminated on the substrate, and a first slot is formed in the metal layer. A first tunable material layer, a metal layer, and a second tunable material layer are sequentially laminated on the substrate, and a first slot is formed in the metal layer. A second slot tilted with respect to the first slot is formed in the metal layer.

20 Claims, 3 Drawing Sheets

(51) Int. Cl.
    *H01Q 13/18*    (2006.01)
    *B82Y 40/00*    (2011.01)
    *H01Q 13/10*    (2006.01)
    *H01Q 13/28*    (2006.01)
    *G02B 6/12*    (2006.01)
    *H01Q 5/22*    (2015.01)
    *G02F 1/00*    (2006.01)

(52) U.S. Cl.
    CPC .......... *G02B 6/12007* (2013.01); *G02F 1/011* (2013.01); *H01Q 5/22* (2015.01); *H01Q 13/103* (2013.01); *H01Q 13/18* (2013.01); *H01Q 13/28* (2013.01); *G02B 2006/12142* (2013.01); *G02F 1/0018* (2013.01); *G02F 1/0045* (2013.01)

(58) Field of Classification Search
    CPC . G02F 1/011; G02F 1/19; G02F 1/292; H01Q 13/18; H01Q 5/22; H01Q 13/10; H01Q 13/103; H01Q 13/22; H01Q 13/28; G02B 5/008; G02B 6/12007; G02B 6/1226; G02B 2006/12142; B82Y 20/00; B82Y 40/00; G01N 21/554; G01N 21/658; G01N 21/7743

USPC ................ 359/240, 245, 279, 288, 298–300; 257/342; 438/71

See application file for complete search history.

(56) References Cited

U.S. PATENT DOCUMENTS

| | | | | |
|---|---|---|---|---|
| 8,480,000 | B2* | 7/2013 | Chen ..................... | B65D 31/02 235/375 |
| 8,588,920 | B2* | 11/2013 | Naughton .............. | B82Y 15/00 600/379 |
| 8,948,562 | B2* | 2/2015 | Norris ................... | B81C 99/009 216/33 |
| 9,356,238 | B2* | 5/2016 | Norris ................... | B81C 99/009 |
| 9,385,435 | B2* | 7/2016 | Bily ...................... | H01Q 13/22 |
| 9,716,307 | B2* | 7/2017 | Tsai ....................... | H01Q 1/243 |
| 2012/0170097 | A1 | 7/2012 | Han et al. | |
| 2013/0057857 | A1 | 3/2013 | Jamshidi et al. | |
| 2013/0070459 | A1 | 3/2013 | Kim et al. | |
| 2014/0376073 | A1 | 12/2014 | Kim et al. | |
| 2015/0123748 | A1* | 5/2015 | Stevenson ............. | H01P 11/008 333/235 |

FOREIGN PATENT DOCUMENTS

| | | |
|---|---|---|
| KR | 10-2013-0006287 A | 1/2013 |
| KR | 10-2013-0030100 A | 3/2013 |
| KR | 10-1301969 B1 | 8/2013 |
| KR | 10-2014-0147383 A | 12/2014 |

OTHER PUBLICATIONS

Z.L. Samson et al; "Metamaterial electro-optic switch of nanoscale thickness"; AIP | Applied Physics Letters; vol. 96; 2010; 4 pages total.

Stephen B. Abbott et al.; "Photorefractive control of surface plasmon polaritons in a hybrid liquid crystal cell"; Optics Letters; vol. 37; No. 13; Jul. 1, 2012; 3 pages total.

Communication dated Dec. 10, 2014 issued by the International Searching Authority in counterpart International Patent Application No. PCT/KR2014/008062 (PCT/ISA/210).

* cited by examiner

TUNABLE NANO-ANTENNA AND METHODS OF MANUFACTURING AND OPERATING THE SAME

TECHNICAL FIELD

The present disclosure relates to antennas, and more particularly, to wavelength-tunable optical nano-antennas and methods of manufacturing and operating the same.

BACKGROUND ART

Optical nano-antennas are kinds of optical devices that receive light and convert the received light into an electromagnetic field or perform an opposite function thereto. Radio waves used for mobile phone communication have a wavelength of approximately several cm. Thus, antennas for mobile phone communication have a certain degree of size. However, a wavelength of light is as extremely low as approximately 500 nm. For this reason, optical nano-antennas have to be made as thin as approximately 100 nm, which is a hundred-thousandth the thickness of human hair. It is possible to manufacture such minute antennas in accordance with the development of nanotechnology. However, there is a limitation that the antennas formed of nanoparticles can transmit and receive only light having a single wavelength. Thus, optical nano-antennas of the related art are not so effective to function as transmitters-receivers in various wavelengths.

DETAILED DESCRIPTION OF THE INVENTION

Technical Problem

Provided are active-type optical nano-antennas, which are wavelength-tunable antennas and capable of switching.

Provided are methods of manufacturing the tunable optical nano-antennas.

Provided are methods of operating the tunable optical nano-antennas.

Technical Solution

According to an aspect of the present invention, an optical nano-antenna includes: a substrate; and a plurality of material layers sequentially laminated on the substrate; wherein the plurality of material layers include at least one tunable material layer and at least one slot.

A first tunable material layer and a metal layer may be sequentially laminated on the substrate, and a first slot may be formed in the metal layer.

A metal layer and a first tunable material layer may be sequentially laminated on the substrate, and a first slot may be formed in the metal layer.

A first tunable material layer, a metal layer, and a second tunable material layer may be sequentially laminated on the substrate, and a first slot may be formed in the metal layer.

A second slot tilted with respect to the first slot may be formed in the metal layer.

The tunable material layer may be any one of a liquid crystal layer, a phase change material layer, and a graphene layer.

According to another aspect of the present invention, a method of manufacturing an optical nano-antenna includes: forming a plurality of material layers including a metal layer and a tunable material layer on a substrate; and forming a first slot in the metal layer.

The forming of the plurality of material layers may include sequentially laminating a first tunable material layer and a metal layer on the substrate.

The forming of the plurality of material layers may include sequentially laminating a metal layer and a first tunable material layer on the substrate.

The forming of the plurality of material layers may include sequentially laminating a first tunable material layer, a metal layer, and a second tunable material layer on the substrate.

The method may further include forming a second slot for changing a traveling direction of light in the metal layer.

According to another aspect of the present invention, a method of operating an optical nano-antenna including a plurality of material layers sequentially laminated on a substrate, the plurality of material layers including at least one tunable material layer and at least one slot includes: changing an optical characteristic of the tunable material layer by applying an operation signal to the tunable material layer.

The operation signal may be any one of an electrical signal, an optical signal, and a thermal signal.

The plurality of material layers may include a tunable material layer and a metal layer which are sequentially laminated on the substrate, and a first slot is formed in the metal layer.

The plurality of material layers may include a metal layer and a tunable material layer which are sequentially laminated on the substrate, and a first slot is formed in the metal layer.

The plurality of material layers may include a first tunable material layer, a metal layer, and a second tunable material layer which are sequentially laminated on the substrate, and a first slot is formed in the metal layer.

The method may further include forming a second slot tilted with respect to the first slot in the metal layer.

ADVANTAGEOUS EFFECTS OF THE INVENTION

The tunable optical nano-antenna of the present disclosure includes a wavelength-tunable material layer. The tenability of the wavelength-tunable material layer may be controlled in an electric, optical, or thermal manner depending on a tunable material layer. Thus, the optical nano-antenna may be utilized as an optical nano-antenna having a wide optical bandwidth, or may be utilized as an active element that may be controlled in real time by various control methods. Therefore, the utilization of the optical nano-antenna of the present disclosure may increase as compared with a passive optical nano-antenna of the related art.

BEST MODE

Figure 1:
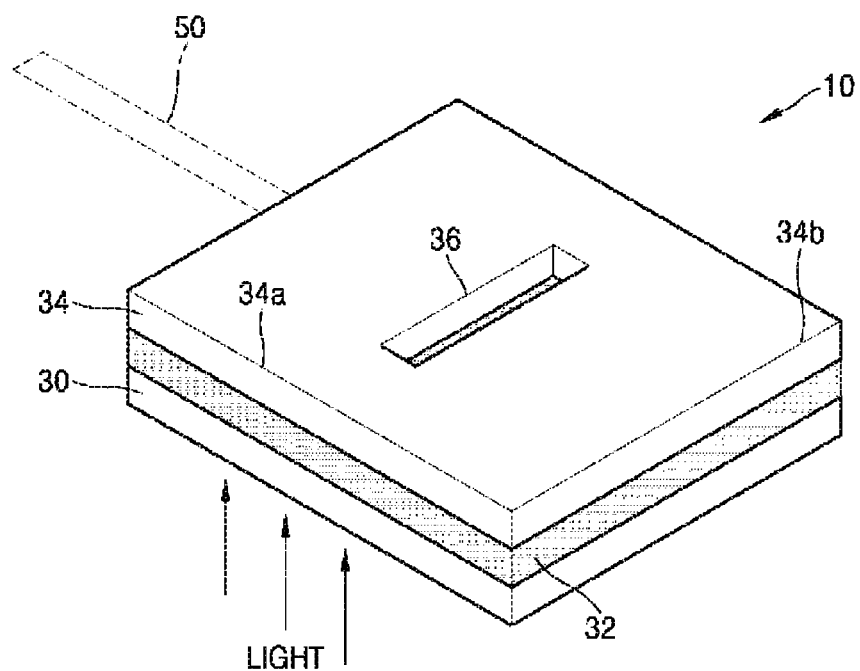
FIG. 1 is a perspective view of an optical nano-antenna according to an embodiment of the present disclosure.

According to an aspect of the present disclosure, an optical nano-antenna includes: a substrate; and a plurality of material layers sequentially laminated on the substrate; wherein the plurality of material layers include at least one tunable material layer and at least one slot.

According to another aspect of the present disclosure, a method of manufacturing an optical nano-antenna includes: forming a plurality of material layers including a metal layer and a tunable material layer on a substrate; and forming a first slot in the metal layer.

According to another aspect of the present disclosure, a method of operating an optical nano-antenna including a plurality of material layers sequentially laminated on a substrate, the plurality of material layers including at least one tunable material layer and at least one slot includes: changing an optical characteristic of the tunable material layer by applying an operation signal to the tunable material layer.

MODE OF THE INVENTION

Hereinafter, a tunable optical nano-antenna and methods of manufacturing and operating the same will be described in detail with reference to the accompanying drawings. In the drawings, the thicknesses of layers and regions are exaggerated for clarity. As used herein, the term "and/or" includes any and all combinations of one or more of the associated listed items. Expressions such as "at least one of," when preceding a list of elements, modify the entire list of elements and do not modify the individual elements of the list.

First, a tunable optical nano-antenna will be described below.

FIG. 1 illustrates the tunable optical nano-antenna according to an embodiment of the present disclosure.

Referring to FIG. 1, a first tunable material layer 32 is formed on a substrate 30. The substrate 30 may be a transparent substrate or non-transparent substrate depending on a light incidence direction. For example, as illustrated in FIG. 1, when light is incident on a nano-antenna 10 from below, the substrate 30 may be a transparent substrate with respect to incidence light. As another example, when light is transmitted to the side of the nano-antenna 10 through a light guide unit 50, the substrate 30 may be an opaque substrate. However, the present disclosure is not limited thereto. That is, even when light is incident on the side of the nano-antenna 10 through the light guide unit 50, the substrate 30 may be a transparent substrate. The light guide unit 50 may be, for example, an optical fiber or a waveguide. The light guide unit 50 may be connected to lateral surfaces of the first tunable material layer 32 and/or a metal layer 34.

The first tunable material layer 32 may change a wavelength of light incident thereon. That is, the wavelength of the light incident on the first tunable material layer 32 may be changed into a different wavelength in response to a predetermined signal applied to the first tunable material layer 32. The predetermined signal may be an electrical signal (for example, voltage), an optical signal (for example, pumping source), or a thermal signal (for example, temperature) depending on the type of first tunable material layer 32. The first tunable material layer 32 having such a characteristic may be, for example, a liquid crystal layer, a phase change material layer, or a graphene layer. However, the first tunable material layer 32 is not limited to the above-mentioned material layers. That is, any material may be used to form the first tunable material layer 32 as long as the material has a variable refractive index depending on a surrounding environment. The phase change material layer may be, for example, a $VO_2$ layer or a chalcogenide material layer. The chalcogenide material layer may be a layer used for a semiconductor memory device. For example, the chalcogenide material layer may be an alloy of Ge(In, As, Se) and Sb(Bi, Au, As).

When the first tunable material layer 32 is a liquid crystal layer, the first tunable material layer 32 may serve as an ON/OFF switch for blocking or transmitting light.

Subsequently, a metal layer 34 is formed on the first tunable material layer 32. A first slot 36 penetrating the metal layer 34 is formed at a predetermined location of the metal layer 34. A dimension (for example, length, width, or depth) of the first slot 36 may be determined in consideration of light to be generated. A resonance condition is determined depending on the dimension of the first slot 36, and light conforming with the resonance condition may be formed and radiated. The first slot 36 is perpendicular to a first side 34a of the metal layer 34 and is parallel to a second side 34b perpendicular to the first side 34a.

Figure 2:
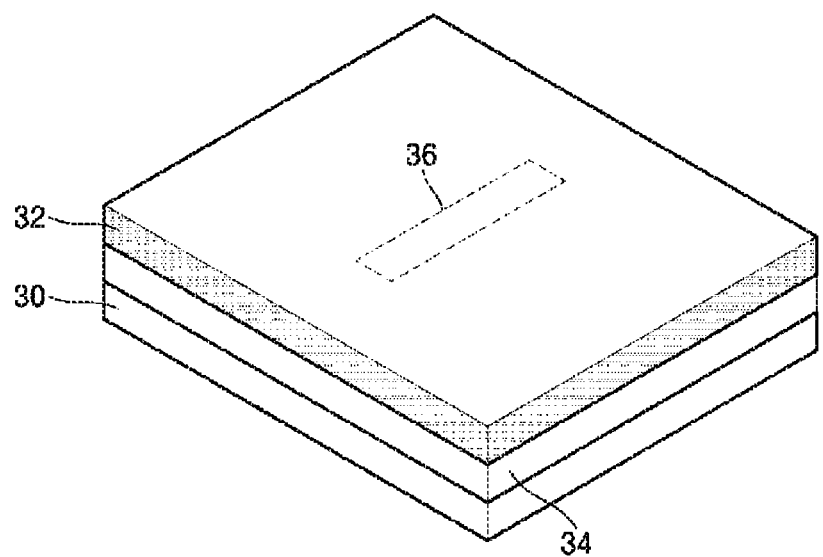
FIG. 2 is a perspective view of an optical nano-antenna according to another embodiment of the present disclosure.

FIG. 2 illustrates an optical nano-antenna according to another embodiment of the present disclosure.

Figure 3:
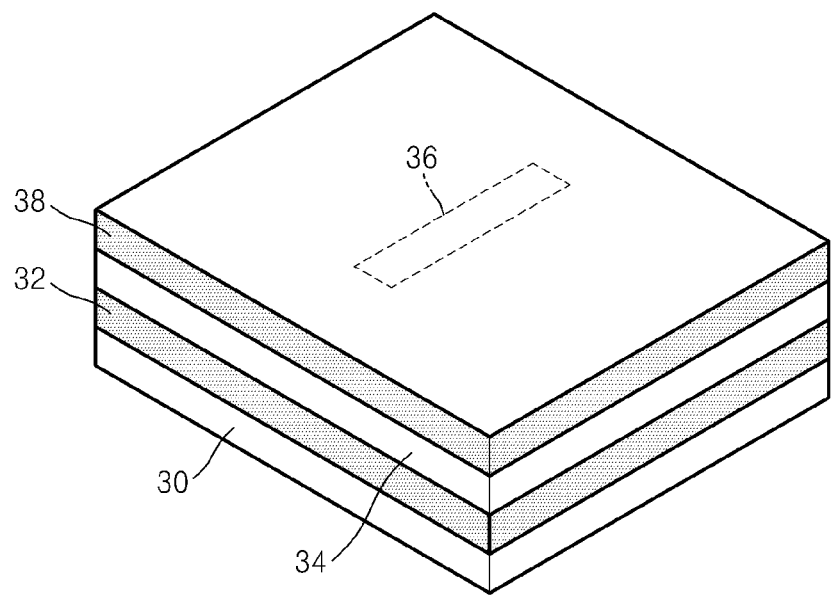
FIG. 3 is a perspective view of an optical nano-antenna according to another embodiment of the present disclosure.

Referring to FIG. 2, the metal layer 34 having the first slot 36 is disposed on the substrate 30, and the first tunable material layer 32 is disposed on the metal layer 34. FIG. 3 illustrates an optical nano-antenna according to another embodiment of the present disclosure.

Referring to FIG. 3, the first tunable material layer 32 is disposed on the substrate 30. The metal layer 34 having the first slot 36 is disposed on the first tunable material layer 32. A second tunable material layer 38 is formed on the metal layer 34. The second tunable material layer 38 may be formed of one of material layers of the first tunable material layer 32 described above. The second tunable material layer 38 may be the same material layer as or a different material layer from the first tunable material layer 32. FIG. 3 illustrates a case where tunable material layers are respectively disposed on and under the metal layer 34.

In the case illustrated in FIG. 3, in order to make a wavelength variable, a predetermined signal may be applied to both or any one of the first and second tunable material layers 32 and 38.

Figure 4:
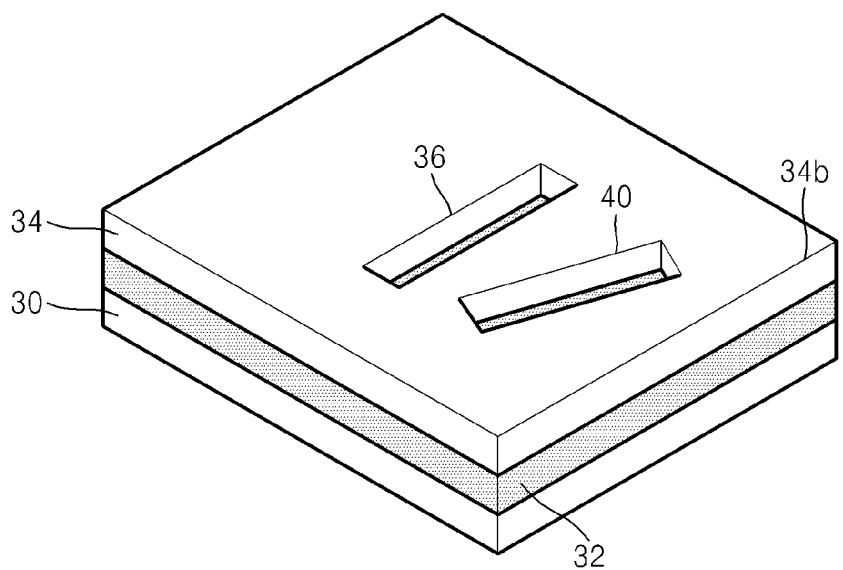
FIG. 4 is a perspective view illustrating a case where the optical nano-antenna of FIG. 1 further includes a switching slot (second slot).
Figure 5:
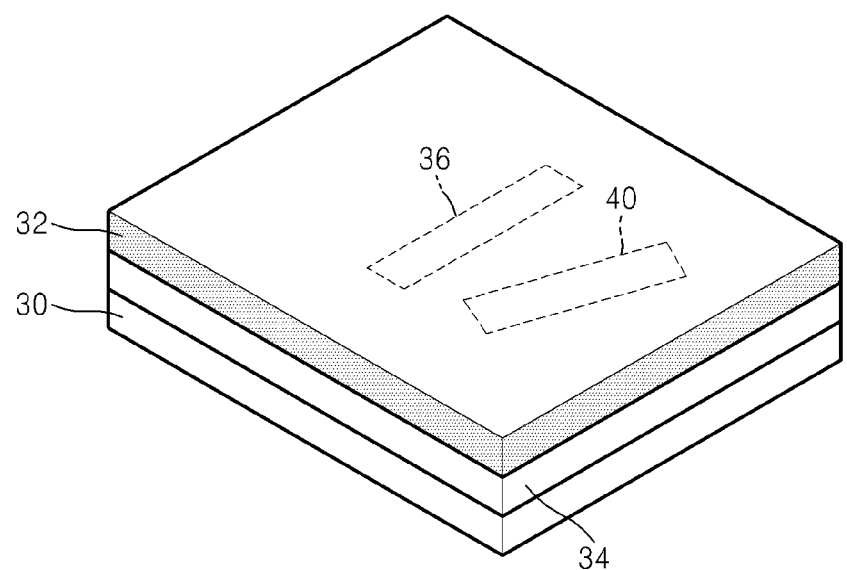
FIG. 5 is a perspective view illustrating a case where the optical nano-antenna of FIG. 2 further includes a switching slot.
Figure 6:
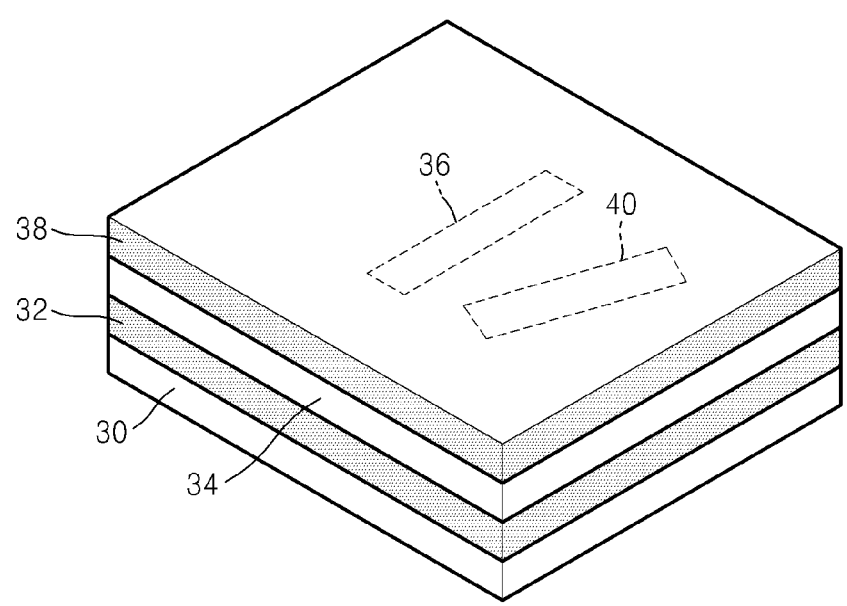
FIG. 6 is a perspective view illustrating a case where the optical nano-antenna of FIG. 3 further includes a switching slot.

FIGS. 4 to 6 illustrate a case where the optical nano-antenna of FIGS. 1 to 3 includes a second slot 40.

Referring to FIG. 4, the first and second slots 36 and 40 are formed in the metal layer 34. The second slot 40 is used to change a traveling direction of light. The traveling direction of light may be switched depending on a light polarization direction or the position of the second slot 40. That is, the second slot 40 serves as a nano-switch. The second slot 40 may be located between the first slot 36 and the second side 34b of the metal layer 34. The second slot 40 is tilted with respect to the first slot 36. The dimension of the second slot 40 and a tilt angle of the second slot 40 with respect to the first slot 36 may be determined in consideration of a switching direction of light.

As illustrated in FIG. 5, the first tunable material layer 32 may be disposed on the metal layer 34 having the first and second slots 36 and 40. That is, the metal layer 34 having the first and second slots 36 and 40 formed therein may be located between the substrate 30 and the first tunable material layer 32.

As illustrated in FIG. 6, in the nano-antenna of FIG. 4, the second tunable material layer 38 may further be disposed on the metal layer 34 in which the first and second slots 36 and 40 are formed.

Next, a method of manufacturing the above-mentioned optical nano-antenna will be described.

Referring to FIG. 1, the first tunable material layer 32 is formed on the substrate 30. After the metal layer 34 is prepared, the first slot 36 is formed in a predetermined region of the metal layer 34. The first slot 36 may be formed by etching a portion of the metal layer 34 in which the first slot 36 is to be formed, by using a nano-patterning process, for example, an e-beam lithography process or a focused ion beam (FIB) process. The metal layer 34 having the first slot 36 formed therein is attached onto the first tunable material layer 32. Alternatively, the first tunable material layer 32 may be attached to the metal layer 34.

The metal layer 34 having the first slot 36 may be formed in the following manner.

That is, after the metal layer 34 is formed on the first tunable material layer 32, the first slot 36 may be formed in the metal layer 34 by using the above-mentioned nano-patterning process. The metal layer 34 may be a thin metal film.

The optical nano-antenna illustrated in FIG. 2 is formed by changing the order of laminating the first tunable material layer 32 and the metal layer 34 of FIG. 1. That is, the metal layer 34 and the tunable material layer 32 are sequentially laminated on the substrate 30.

The optical nano-antenna illustrated in FIG. 3 is formed by sequentially laminating the first tunable material layer 32 and the metal layer 34 on the substrate 30, forming the first slot 36 in the metal layer 34, and then laminating the second tunable material layer 38 on the metal layer 34 in which the first slot 36 is formed.

The optical nano-antenna illustrated in FIGS. 4 to 6 is formed by further forming the second slot 40 in the metal layer 34 of the optical nano-antenna illustrated in FIGS. 1 to 3. The second slot 40 and the first slot 36 may be formed at the same time.

Next, a method of operating the above-mentioned optical nano-antenna will be described.

When at least one of the first and second tunable material layers 32 and 38 is a liquid crystal layer, for example, when the first tunable material layer 32 is a liquid crystal layer, an electrical signal is applied to the liquid crystal layer so that a polarizing axis of the liquid crystal layer is perpendicular or parallel to a polarizing axis of incidence light. As a result, an optical signal may be turned on or turned off.

Alternatively, a traveling direction of the optical signal may be changed by turning a polarizing axis depending on the type of liquid crystal, that is, may be switched.

When at least one of the first and second tunable material layers 32 and 38 is a phase change material layer, for example, when the first tunable material layer 32 is a phase change material layer, a thermal signal is applied to the phase change material layer so as to change an electrical state of the phase change material layer. That is, the temperature of the phase change material layer is changed so that the phase change material layer reaches a change in state. Thus, an electrical property of the phase change material layer may be changed from an insulator to a conductor. At this time, a refractive index of the phase change material layer also changes. Consequently, since a resonance characteristic of the optical nano-antenna varies due to the change in state of the phase change material layer, the resonance characteristic of the optical nano-antenna may be controlled by adjusting the thermal signal applied to the phase change material layer. When the electrical property of the phase change material layer is an insulator, the optical nano-antenna may lose properties of an antenna. A device function of the optical nano-antenna may be turned on or turned off by using the property of the phase change material layer.

The electrical state of the phase change material layer may be changed using a method of directly applying heat to the phase change material layer, or may be changed using a method of instantaneously changing the temperature of the phase change material layer by the application of a light pulse to the phase change material layer.

When at least one of the first and second tunable material layers 32 and 38 is a graphene layer, for example, when the first tunable material layer 32 is a graphene layer, a work function of the graphene may be changed by applying a voltage to the graphene layer. When the work function of the graphene layer varies, a resonance characteristic of the optical nano-antenna varies. Therefore, a resonance condition of the optical nano-antenna may be controlled by adjusting a voltage to be applied to the graphene layer.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

INDUSTRIAL APPLICABILITY

An optical nano-antenna and methods of manufacturing and operating the same, according to embodiments of the present disclosure may be used in various products where optical nano-antennas/switches may be used, for example, a nano-sized optical component or plasmon component.

The invention claimed is:
1. An optical antenna comprising:
a substrate; and
a plurality of material layers sequentially laminated on the substrate;
wherein the plurality of material layers comprise at least one tunable material layer, at least one metal layer, and at least one slot in at least one of the at least one metal layer.
2. The optical antenna of claim 1, wherein:
the at least one tunable material layer comprises a first tunable material layer,
the at least one metal layer comprises a first metal layer,
the first tunable material layer and the first metal layer are sequentially laminated on the substrate, and
a first slot is formed in the first metal layer.
3. The optical antenna of claim 2, wherein a second slot, tilted with respect to the first slot, is formed in the first metal layer.
4. The optical antenna of claim 1, wherein:
the at least one metal layer comprises a first metal layer, the at least one tunable material layer comprises a first tunable material layer, the first metal layer and the first tunable material layer are sequentially laminated on the substrate, and a first slot is formed in the first metal layer.

5. The optical antenna of claim 4, wherein a second slot, tilted with respect to the first slot, is formed in the first metal layer.

6. The optical antenna of claim 1, wherein:

the at least one tunable material layer comprises a first and a second tunable material layer, the at least one metal layer comprises a first metal layer, the first tunable material layer, the first metal layer, and the second tunable material layer are sequentially laminated on the substrate, and a first slot is formed in the first metal layer.

7. The optical antenna of claim 6, wherein a second slot, tilted with respect to the first slot, is formed in the first metal layer.

8. The optical antenna of claim 1, wherein the at least one tunable material layer is one of a liquid crystal layer, a phase change material layer, and a graphene layer.

9. A method of manufacturing an optical antenna, the method comprising:

forming a plurality of material layers comprising a metal layer and a first tunable material layer on a substrate; and forming a first slot in the metal layer.

10. The method of claim 9, wherein the forming of the plurality of material layers comprises sequentially laminating the first tunable material layer and the metal layer on the substrate.

11. The method of claim 9, wherein the forming of the plurality of material layers comprises sequentially laminating the metal layer and the first tunable material layer on the substrate.

12. The method of claim 9, wherein the forming of the plurality of material layers comprises sequentially laminating the first tunable material layer, the metal layer, and a second tunable material layer on the substrate.

13. The method of claim 9, further forming a second slot in the metal layer for changing a traveling direction of light.

14. The method of claim 9, wherein the first tunable material layer is one of a liquid crystal layer, a phase change material layer, and a graphene layer.

15. A method of operating an optical antenna comprising a plurality of material layers sequentially laminated on a substrate, the plurality of material layers comprising at least one tunable material layer, at least one metal layer, and at least one slot in at least one of the at least one metal layer, the method comprising:

changing an optical characteristic of at least one of the at least one tunable material layer by applying an operation signal to the at least one of the at least one tunable material layer.

16. The method of claim 15, wherein the operation signal is one of an electrical signal, an optical signal, and a thermal signal.

17. The method of claim 15, wherein:

the plurality of material layers comprise a first tunable material layer and a first metal layer which are sequentially laminated on the substrate, and a first slot is formed in the first metal layer.

18. The method of claim 17, further comprising forming a second slot tilted with respect to the first slot in the first metal layer.

19. The method of claim 15, wherein:

the plurality of material layers comprise a first metal layer and a first tunable material layer which are sequentially laminated on the substrate, and a first slot is formed in the first metal layer.

20. The method of claim 15, wherein:

the plurality of material layers comprise a first tunable material layer, a first metal layer, and a second tunable material layer which are sequentially laminated on the substrate, and a first slot is formed in the first metal layer.

* * * * *